United States Patent [19]

Langere et al.

[11] 4,028,266

[45] June 7, 1977

[54] STABILIZED HYDROUS PENTAVALENT ANTIMONY OXIDE SOL COMPOSITION AND ITS PRODUCTION, PRODUCTION OF DRY POWDER FROM SOL COMPOSITION AND RESULTING DRY POWDER

[75] Inventors: Ronald Francis Langere, Cranbury; Otto Ernest Loeffler, Rahway, both of N.J.

[73] Assignee: NL Industries, Inc., New York, N.Y.

[22] Filed: Apr. 15, 1976

[21] Appl. No.: 677,313

[52] U.S. Cl. .............................. 252/313 R; 252/8.1; 252/309; 252/363.5; 423/617
[51] Int. Cl.$^2$ ....................... B01J 13/00; B01F 3/12
[58] Field of Search ................. 252/313 R, 363.5; 106/303; 423/617

[56] References Cited

UNITED STATES PATENTS

| | | | |
|---|---|---|---|
| 3,281,216 | 10/1966 | Mindick et al. | 252/313 S X |
| 3,676,362 | 7/1972 | Yates | 252/8.1 X |
| 3,860,523 | 1/1975 | Petrow et al. | 252/313 R X |

*Primary Examiner*—Richard D. Lovering

[57] ABSTRACT

An aqueous stabilized antimony pentoxide sol composition, comprising from 25% to 35% antimony pentoxide, from 6.5% to 17% of an amine and the remainder water, has been prepared. A dried composition obtained from this sol composition has also been prepared. The dried powder contains from 62% to 76% antimony pentoxide, from 17% to 32% of an amine and the remainder absorbed and combined water. This dried composition when added to water or an organic solvent readily forms the stabilized sol composition originally obtained.

4 Claims, No Drawings

STABILIZED HYDROUS PENTAVALENT ANTIMONY OXIDE SOL COMPOSITION AND ITS PRODUCTION, PRODUCTION OF DRY POWDER FROM SOL COMPOSITION AND RESULTING DRY POWDER

BACKGROUND OF THE INVENTION

Antimony oxide products have been used for many years in plastics and textiles to increase the flame resistance properties of the treated material. Antimony oxide pigments have been added with only limited success because the well-known antimony oxide pigment particles are too large e.g. (0.5–3 microns) to obtain maximum effect. Antimony pentoxide has been hydrolyzed in situ onto the material to be treated but these treatments have resulted in only limited success.

A method for preparing an antimony trioxide sol is described in U.S. Pat. No. 3,676,362 in which an antimony trichloride is dissolved in an organic solution, treated with $NH_4OH$ to produce $NH_4Cl$ and antimony trioxide. The $NH_4Cl$ is removed and the antimony trioxide is present as a sol in the solution. The prior art also teaches that an antimony pentoxide sol is more effective than trivalent antimony oxide when added as a flame retardant agent.

One prior art method of preparing the antimony pentoxide sol is described in U.S. Pat. No. 3,860,523. In this procedure a solution of potassium antimonate (containing 2% by weight of antimony calculated as $Sb_2O_5$) is passed through a hydrogen form cation exchange resin whereby the potassium ions are exchanged for hydrogen ions to yield a pentavalent antimony oxide sol. In practice, however, it has been found that the low concentration of antimony pentoxide obtained by this process requires an additional evaporation step to obtain a sufficiently high concentration of antimony to be of real commercial value. This separate evaporation step adds to the cost of the operation which is undesirable.

Other prior art methods are described which show that antimony pentoxide may be formed from antimony trioxide by treating the antimony trioxide with HCl to form antimony trichloride which in turn is oxidized to antimony pentoxide by reacting the antimony trichloride with hydrogen peroxide and subsequently hydrolyzing the antimony values to form hydrates of antimony pentoxide. The prior art attempts to prepare sols of these hydrates have failed, however, in producing stable sols having concentrations above 10% solids. Again the evaporation costs to produce higher concentrations are undesirable.

The instant invention covers the preparation of an antimony pentoxide sol composition which is stable upon standing and has a concentration of antimony pentoxide from 25% to 35%. This type of sol is particularly useful as a commercial product in plastics and textiles for improving the flame retardant properties since the sol does not have to be concentrated before use.

SUMMARY OF THE INVENTION

An antimony pentoxide sol composition stable in aqueous media has been prepared. The aqueous sol composition contains from 25% to 35% antimony pentoxide, from 6.5% to 17% of an amine and the remainder is water. This aqueous sol when dried may be redispersed in water or an organic solvent depending on the amine additive to obtain again the sol composition. The dried powder contains from 62% to 76% antimony pentoxide, from 17% to 32% of an amine and the remainder absorbed and combined water.

DESCRIPTION OF THE PREFERRED EMBODIMENTS

The stable sol composition of the instant invention is prepared as follows:

A slurry is prepared by admixing with agitation 1 part of antimony trioxide, from 1.2 to 2.5 parts of water and from 0.2 to 0.6 part of an amine, all of the parts are expressed on a weight basis.

To this antimony oxide slurry was then added slowly under reflux over a period of from 5 minutes to 1½ hours from 0.65 to 0.68 part of hydrogen peroxide (35% $H_2O_2$). During the addition, an exothermic reaction was obtained and the mixture was heated to reflux and refluxed from 5 minutes to 1 hour after the hydrogen peroxide was added. The mixture was then cooled to 40°–50° C. and a colloidal solution was formed.

The stabilized sol obtained contained from 25 to 35% antimony pentoxide, from 6.5% to 17% of the amine and the remainder water.

This sol is useful, for example, as an addition to a latex formulation to produce flame retardant properties to the latex product. This sol when used in the latex formulation imparts a translucent character to the product instead of being opaque.

This sol solution may be stored and subsequently used as formed or this sol solution may be dried. The dried powder will contain from 62% to 76% antimony pentoxide and from 17% to 32% of the amine.

This powder may be employed as a powder addition to PVC for example to give a translucent instead of an opaque character to the PVC and the resultant PVC sheet possesses excellent heat stability due to the powder added to the sheet.

The dried powder readily disperses in water or an organic solvent to form again the stable sol of this invention.

This reformed sol may be used for the same purposes as the sol originally produced.

This sol also may be used as pad-on operations which do not involve a water wash.

Although the powder may be dispersed in many organic solvents, it has been found that the following organic solvents are particularly desirable to use when employed in the fiber industry. These solvents include among others dimethyl acetamide, acetone, methylene chloride, ethylene glycol, dimethyl sulfoxide and the like.

With respect to the amines which may be employed, among those which are most satisfactory include secondary or tertiary aliphatic amines, having from 1 to 5 carbon atoms, and cyclicamines, such as morpholine and the like.

In order to describe more fully the instant invention, the following examples are presented:

EXAMPLE 1

145.8 g. of antimony trioxide and 42 g. of triethanolamine were added with stirring to 210 ml. water contained in a reaction vessel equipped with a reflux condenser. The mixture was stirred at ambient conditions to disperse the antimony trioxide.

To this mixture were added 97.2 g. of 35% hydrogen peroxide over a period of 15 minutes. During this addition, an exothermic reaction took place which produced enough heat to reflux the batch. After refluxing for 30 minutes, the batch was filtered to produce the aqueous sol. The sol had the following properties:

| | |
|---|---|
| $Sb_2O_5$ % | 30.5 |
| Amine Additive % | 8.5 |
| Sp. Gr. | 1.405 |
| pH | 3.7 |
| Visc. (cps) | 14 |
| Particle Size Avg. Å | 150 |

This aqueous sol is a commercial product which may be used in this form to treat textiles to impart flame retardancy to the fabric. It is also useful for aqueous pad on to nylon textiles, particularly carpets to impart excellent flame retardancy.

Another product which was prepared is a dry powder which was produced by spray drying at 60° C. the sol described above. This spray dried powder possessed the ability to reform the aqueous sol by mixing the powder thoroughly with water. The spray dried product had the following properties:

| | |
|---|---|
| $Sb_2O_5$ % | 74.1 |
| Amine Additive % | 20.8 |
| Sp. Gr. | 2.61 |
| Visc. (cps) | 30 (dispersed at 30% conc.) |
| Particle Size Avg. Å | 150 (dispersed) |

The dried powder was added to PVC and the PVC was formed into a sheet which was translucent and possessed excellent heat stability.

The dried powder can be redispersed in water and employed in a pad-on application for textiles.

EXAMPLES 2-8

In these examples the procedure of Example 1 was repeated except that the amines employed were varied.

The operational details and the results obtained are recorded in the Table along with those of Example 1.

It should be noted that the viscosity of the sol increases greatly as a 5 carbon chain amine is employed (see Example 8).

EXAMPLES 9-11

In these examples the procedure of Example 1 was employed except that the concentrations of the ingredients were varied. In Example 9 the amount of water was increased while in Example 10 it was decreased. In Example 11 the amount of amine added was doubled.

Again the operational details and the results obtained are recorded in the Table.

From the above description and by the examples presented, a sol containing from 25% to 35% antimony pentoxide and from 6.5% to 17% of an amine was prepared.

This sol also may be dried to obtain a powder containing from 62% to 76% antimony pentoxide and from 17% to 32% of an amine. The powder also may be reformed to form the sol originally produced.

These products are useful for a variety of purposes including flame retardant agent for latex formulations or textiles. They are also useful in the spinning of textile fibers since they disperse or are soluble in the common spinning solvents.

While this invention has been described and illustrated by the examples shown, it is not intended to be strictly limited thereto, and other variations and modifications may be employed within the scope of the following claims.

TABLE

| Ingredients Employed | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Total Water (g.) | 210 | 210 | 210 | 210 | 210 | 210 | 210 | 210 | 362 | 177 | 170 |
| Antimony Trioxide (g.) | 146 | 146 | 146 | 146 | 146 | 146 | 146 | 146 | 146 | 146 | 146 |
| Type of Amine Added | Triethanol Amine | Triethyl Amine | Diethanol Amine | Diethyl Amine | Dimethyl Amine | Dibutyl Amine | Tributyl Amine | Triamyl Amine | Triethanol Amine | Triethanol Amine | Triethyl Amine |
| Amount of Amine (g.) | 42 | 42 | 42 | 42 | 42 | 42 | 42 | 42 | 42 | 42 | 84 |
| 35% Hydrogen Peroxide (g.) | 97 | 97 | 97 | 97 | 97 | 97 | 97 | 97 | 97 | 97 | 97 |
| Time of Refluxing (hrs.) | 1/2 | 1/6 | 1/6 | 1/6 | 1/6 | 1/6 | 1/6 | 1/2 | 1/2 | 1/2 | 1/2 |
| Properties of Sol Obtained | | | | | | | | | | | |
| Antimony Pentoxide % | 30.5 | 30 | 30 | 30 | 30 | 30 | 30 | 30 | 25 | 35 | 30 |
| Amine % | 8.5 | 8.5 | 8.5 | 8.5 | 8.5 | 8.5 | 8.5 | 8.5 | 6.5 | 9.1 | 16.9 |
| pH | 3.7 | 4.9 | 2.5 | 7.1 | 8.4 | 4.1 | 4.5 | 3.6 | 3.2 | 3.2 | 6.7 |
| Visc. (cps) | 14 | — | — | — | — | — | 40 | 304,000 | 12 | 840 | 26 |

We claim:

1. A stable aqueous antimony pentoxide sol comprising from 25% to 35% antimony pentoxide, from 6.5% to 17% of an amine and the remainder water, said sol prepared by admixing antimony trioxide, an amine and water and to said mixture adding $H_2O_2$ slowly with refluxing for a period of 5 minutes to 1½ hours then cooling the mixture, thus forming the stable sol, the amount of ingredients added for each part of antimony trioxide being from 1.2 to 2.5 parts of water, from 0.2 to 0.6 parts of an amine and from 0.65 to 0.68 parts of hydrogen peroxide, all of the parts and percentages expressed on a weight basis, said amine being selected from the group consisting of secondary and tertiary aliphatic amines having from 1 to 5 carbon atoms and cyclicamines.

2. A process for producing a stable aqueous antimony pentoxide sol comprising from 25% to 35% antimony pentoxide, from 6.5% to 17% of an amine and the remainder water, said sol prepared by admixing antimony trioxide, an amine and water and to said mixture adding hydrogen peroxide slowly with refluxing for a period of 5 minutes to 1½ hours then cooling the mixture, thus forming the stable sol, the amounts of ingredients added for each part of antimony trioxide being from 1.2 to 2.5 parts of water, from 0.2 to 0.6 parts of an amine and from 0.65 to 0.68 parts of hydrogen peroxide, all of the parts and percentages expressed on a weight basis, said amine being selected from the group consisting of secondary and tertiary aliphatic amines having from 1 to 5 carbon atoms and cyclicamines.

3. A dry powder comprising from 62% to 76% antimony pentoxide, from 17% to 32% of an amine and the remainder water, said powder prepared by admixing antimony trioxide, an amine and water and to said mixture adding hydrogen peroxide slowly with refluxing for a period of 5 minutes to 1½ hours and cooling said mixture to form a sol and then drying said sol to produce said powder, said mixture containing from 1.2 to 2.5 parts of water, from 0.2 to 0.6 parts of an amine and from 0.65 to 0.68 parts of hydrogen peroxide for each part of antimony trioxide, all parts and percentages expressed on a weight basis, said amine being selected from the group consisting of secondary and tertiary aliphatic amines having from 1 to 5 carbon atoms and cyclicamines.

4. Process for producing a dry powder comprising from 62% to 76% antimony pentoxide from 17% to 32% of an amine and the remainder water which comprises admixing antimony trioxide, an amine and water and to said mixture adding hydrogen peroxide slowly with refluxing for a period of 5 minutes to 1½ hours and cooling said mixture to form a sol and then drying said sol to produce said powder, said mixture containing from 1.2 to 2.5 parts of water, from 0.2 to 0.6 parts of an amine and from 0.65 to 0.68 parts of hydrogen peroxide for each part of antimony trioxide, all parts and percentages expressed on a weight basis, said amine being selected from the group consisting of secondary and tertiary aliphatic amines having from 1 to 5 carbon atoms and cyclicamines.

* * * * *